(12) United States Patent
Rinder et al.

(10) Patent No.: US 11,884,590 B2
(45) Date of Patent: Jan. 30, 2024

(54) FIRE RESISTANT FIBRE CEMENT COMPOSITIONS

(71) Applicant: Swisspearl Group AG, Niederurnen (CH)

(72) Inventors: Tassilo Folker Rinder, Mollis (CH); Oliver Peter Günter Millon, Wädenswil (CH); Carsten Zanders, Mollis (CH)

(73) Assignee: Swisspearl Group AG, Niederurnen (CH)

( * ) Notice: Subject to any disclaimer, the term of this patent is extended or adjusted under 35 U.S.C. 154(b) by 0 days.

(21) Appl. No.: 17/792,487

(22) PCT Filed: Jun. 1, 2022

(86) PCT No.: PCT/EP2022/064888
§ 371 (c)(1),
(2) Date: Jul. 13, 2022

(87) PCT Pub. No.: WO2023/280484
PCT Pub. Date: Jan. 12, 2023

(65) Prior Publication Data
US 2023/0192547 A1    Jun. 22, 2023

(30) Foreign Application Priority Data
Jul. 7, 2021   (EP) .................... 21184330

(51) Int. Cl.
| | |
|---|---|
| *C04B 20/00* | (2006.01) |
| *C04B 14/38* | (2006.01) |
| *C04B 14/42* | (2006.01) |
| *C04B 16/02* | (2006.01) |
| *C04B 28/04* | (2006.01) |
| *C04B 40/00* | (2006.01) |
| *E04D 1/16* | (2006.01) |
| *E04D 3/04* | (2006.01) |
| *E04F 13/14* | (2006.01) |
| *C04B 111/00* | (2006.01) |
| *C04B 111/28* | (2006.01) |

(52) U.S. Cl.
CPC .......... *C04B 20/0052* (2013.01); *C04B 14/38* (2013.01); *C04B 14/42* (2013.01); *C04B 16/02* (2013.01); *C04B 28/04* (2013.01); *C04B 40/0064* (2013.01); *E04D 1/16* (2013.01); *E04D 3/04* (2013.01); *E04F 13/14* (2013.01); *C04B 2111/00586* (2013.01); *C04B 2111/28* (2013.01)

(58) Field of Classification Search
None
See application file for complete search history.

(56) References Cited

U.S. PATENT DOCUMENTS

| | | |
|---|---|---|
| 4,689,084 A | 8/1987 | Ambroise et al. |
| 7,837,788 B2 | 11/2010 | Utagaki et al. |
| 9,862,641 B2 | 1/2018 | Anast et al. |
| 2013/0338269 A1 | 12/2013 | Weerawarna et al. |
| 2019/0077700 A1 | 3/2019 | Xu et al. |

FOREIGN PATENT DOCUMENTS

| | | | |
|---|---|---|---|
| CA | 2 424 744 A1 | 4/2002 | |
| DE | 10 2004 063 271 A1 | 7/2006 | |
| EP | 0 168 191 A2 | 1/1986 | |
| GB | 1 588 938 A | 4/1981 | |
| GB | 2164329 A * | 3/1986 | ............. C04B 14/28 |
| WO | 02/28796 A2 | 4/2002 | |
| WO | 2017/191319 A2 | 11/2017 | |
| WO | 2018/138266 A1 | 8/2018 | |
| WO | 2019/069315 A1 | 4/2019 | |
| WO | 2020/247876 A1 | 12/2020 | |

OTHER PUBLICATIONS

European Search Report for EP 21 18 4330.5 dated Dec. 18, 2021.

* cited by examiner

*Primary Examiner* — Jeffrey D Washville
(74) *Attorney, Agent, or Firm* — Sughrue Mion, PLLC

(57) ABSTRACT

A fibre cement composition comprising at least one hydraulic binder, an organic processing aid fibre as the sole organic fibre within the fibre cement composition, and at least one inorganic fibre, which exhibits excellent fire resistance and mechanical properties.

14 Claims, No Drawings

FIRE RESISTANT FIBRE CEMENT COMPOSITIONS

CROSS REFERENCE TO RELATED APPLICATIONS

This application is a National Stage of International Application No. PCT/EP2022/064888 filed Jun. 1, 2022, claiming priority based on European Patent Application No. 21184330.5 filed Jul. 7, 2021.

TECHNICAL HELD

The present invention relates to fibre cement compositions, and fibre cement building materials obtained from such fibre cement compositions, as well as their methods of manufacturing. The fibre cement compositions display excellent fire resistance.

PRIOR ART

Fibre cement is a composite building and construction material, used mainly in roofing and facade products because of its strength and durability. One common use is that of fibre cement cladding or siding on buildings.

Fibre cement mainly comprises a binder, usually cement, and several types of fibres, both as processing aids during manufacturing as well as mechanical reinforcement.

The fibres that function as processing aids during manufacturing allow the aqueous slurry formed by water, cement and several types of fibres to be picked up on the screen cylinders that are partially submerged in the aqueous slurry. On the other hand, the fibres that function as mechanical reinforcement in the fibre cement product do not significantly aid in the "picking up" step of the manufacturing process.

In currently available fibre cement products, the fibres that function as mechanical reinforcement are mostly chosen among synthetic polymer fibres, such as polyethylene fibres (PE) or polyvinylalcohol fibres (PVA). Such fibres are lightweight, corrosion resistant and readily available.

In fibre cement, the main component is the hydraulic binder in terms of weight percentage.

The relatively high amount of hydraulic binder in fibre cement leads for a very good fire resistance in traditional building materials made of fibre cement, despite the synthetic polymer fibres within, and most fibre cement fulfills the second-most stringent requirements according to EN 13501-1, which is class A2-s1, d0. The test specimens and test procedures Tor classification according to EN 13501-1 can be found in ISO 1182 (class A1), and ISO 1716 as well as EN13823 (class A2-s1, d0).

However, ever tightening fire protection regulations, and a growing awareness of fire hazards in communal buildings, favour the use of building materials that achieve the highest possible fire resistance, i.e. the requirements according to EN 13501-1 class A1. At the same time, the excellent mechanical properties of the traditional fibre cement products should be met, to enable their continuing use as building materials such as cladding or roofing, which protect and cover external surfaces of buildings. Lastly, the fibre cement compositions used to obtain such fibre cement products must remain suitable for processing on existing types of manufacturing machinery without requiring for significant alterations to it.

There exists thus a desire to provide fibre cement products that fulfil the most stringent requirement of existing fire resistance classifications, such as class A1 according to EN 13501-1, as well as compositions for the manufacture thereof that can be used on existing manufacturing machinery, and which essentially retain the mechanical properties of traditional fibre cement products.

SUMMARY OF THE INVENTION

The present invention thus provides fibre cement compositions, as well as the fibre cement products obtained via said fibre cement compositions, that fulfil the requirements according to EN13501-1 A1 and which display excellent mechanical properties.

It is therefore an object of the present invention to provide a fibre cement composition comprising at least one hydraulic binder, an organic processing aid fibre as the sole organic fibre within the fibre cement composition, and at least one inorganic fibre.

It is further an object of the present invention to provide a fiber cement material, such as building material obtained from the fibre cement composition according to the above, preferably via the Hatschek process, such as cladding or roofing elements.

Further embodiments of the invention re laid down in the dependent claims.

DESCRIPTION OF PREFERRED EMBODIMENTS

It is an object of the present invention to provide a fibre cement composition comprising at least one hydraulic binder, an organic processing aid fibre as the sole organic fibre within the fibre cement composition, and at least one inorganic fibre.

The fibre cement composition, which is described by way of its dry components, is suitable for the manufacture of fibre cement products, in particular by the Hatschek process.

A fibre cement product can be obtained by combining the components of the fibre cement composition according to the present invention with a given amount of water to obtain a slurry or suspension comprising the components of the fibre cement composition. The slurry or suspension can then be picked up on a screen cylinder that is partially submerged in the aqueous slurry, and which rotates until a given thickness of the layer of wet fibre cement composition is deposited, after which the layer of wet fibre cement composition is removed from the screen cylinder to be dried and cured, and eventually cut, to yield a fibre cement product. The process is well-known to the person skilled in the art of fibre cement products, and the best-known process for the manufacture of fibre cement products is the so-called "Hatschek process".

It is understood that any disclosure herein relating to the fibre cement composition of the present invention is equally applicable to the corresponding aqueous slurry, or suspension, thereof.

The fibre cement composition according to the present invention comprises at least one hydraulic binder. Suitable hydraulic binders are well-known to the person skilled in the art of fibre cement products and can be chosen from several types of cement such as for example Portland cement. Commercially available cement is for example CEM I 42,5 N according to EN197-1, product "Normo 4" from Holcim.

The fibre cement composition according to the present invention comprises an organic processing aid fibre as the sole organic fibre within the fibre cement composition. It has been found that the organic processing aid fibre is indispensable for the efficient manufacture of the fibre cement products from a fibre cement composition since the organic processing aid fibre enables the deposition of the wet fibre cement composition on the screen cylinders. In trials, the omission of organic processing aid fibre resulted in insufficient pick up of the slurry or suspension of wet fibre cement composition. Consequently, in an effort to minimize the amount of combustible material in the fibre cement composition, the organic processing aid fibre is restricted to be the sole organic fibre within the fibre cement composition.

In a preferred embodiment of the fibre cement composition according to the present invention, the organic processing fibre comprises, or consists of, wood pulp. The wood pulp may be any softwood or hardwood pulp, and preferably is a chemical wood pulp such as kraft or sulfite wood pulp. In a preferred embodiment of the fibre cement composition according to the present invention, the organic processing fibre comprises, or consists of, unbleached or bleached chemical wood pulp, or mixtures of both.

In a preferred embodiment of the fibre cement composition according to the present invention, the organic processing fibre is refined to a fineness of SR° of about 35 to 75, and/or has a fibre length in excess of 2 mm, preferably in excess of 2.5 mm, when measured using a Kajaani FS300 fibre analysis apparatus. If the fibre length is below 2 mm, the amount of picked-up slurry becomes smaller and eventually too small for efficient manufacturing.

The fibre cement composition according to the present invention may comprise at least one inorganic fibre. Inorganic fibres act as mechanical reinforcing fibres that provide excellent mechanical properties to the resulting fibre cement material.

In a preferred embodiment of the fibre cement composition according to the present invention, the inorganic fibre is basalt fibre, glass fibre, or a combination of both basalt fibre and glass fibre. Both basalt fibre and glass fibre are a not flammable replace the traditionally used polymer fibres such as polyethylene fibres and/or polyvinylalcohol fibres while providing mechanical reinforcement in the fibre cement product.

In a preferred embodiment of the fibre cement composition according to the present invention, the inorganic fibre is an inorganic fibre having number or weight average length of about 2 mm to about 16 mm, preferably of about 2 mm to about 8 mm, more preferably of about 2 mm to 6 mm. The inorganic fibre may be chopped or milled inorganic fibre, and preferably is chopped inorganic fibre. An advantage of chopped fibre is the narrower size distribution.

In a preferred embodiment of the fibre cement composition according to the present invention, the inorganic fibre has a diameter of about 5 to 25 micrometers, preferably of from 10 to 20 micrometers.

It has been found that when the length of the inorganic fibre is below 12 mm, and preferably below 8 mm, that the mechanical properties such as the flexural strength of fibre cement products obtained from the fibre cement composition according to the present invention are essentially equivalent to the mechanical properties of fibre cement products obtained from traditional Fibre cement compositions, in which synthetic polymer reinforcing fibres such as polyethylene or polyvinylalcohol are used.

In a preferred embodiment of the fibre cement composition according to the present invention, when the inorganic fibre is a basalt fibre, the inorganic fibre has an number or weight average length of about 2 mm to about 16 mm, preferably of about 2 mm to about 8 mm, more preferably of about 2 mm to 6 mm.

In a preferred embodiment of the fibre cement composition according to the present invention, when the inorganic fibre is a glass fibre, the inorganic fibre has a number or weight average length of about 2 mm to about 16 mm, preferably of about 2 mm to about 8 mm, more preferably of about 2 mm to 6 mm.

In a preferred embodiment of the fibre cement composition according to the present invention, when the inorganic fibre is preferably an alkaline-resistant inorganic fibre.

In a preferred embodiment of the fibre cement composition according to the present invention, when the inorganic fibre is a basalt fibre, the inorganic fibre is preferably an alkaline-resistant basalt fibre.

In a preferred embodiment of the fibre cement composition according to the present invention, when the inorganic fibre is a glass fibre, the inorganic fibre is preferably an alkaline resistant glass fibre.

In a preferred embodiment of the fibre cement composition according to the present invention, the alkaline resistant inorganic fibre, in particular the alkaline resistant glass fibre and alkaline resistant basalt fibre comprise a silane fibre sizing.

In a preferred embodiment of the fibre cement composition according to the present invention, the basalt fibre comprises
  $SiO_2$ of from about 45 to about 60 weight percent, or
  $Al_2O_3$ of from about 12 to about 19 weight percent, or
  $Fe_2O_3$ of from about 5 to about 15, or
  CaO of from about 6 to about 12 weight percent, or
  MgO of from about 3 to about 7 weight percent, or
  $TiO_2$ of from about 0.9 to about 2.0 weight percent, or
  $Na_2O$ of from about 0.9 to about 2.0 weight percent, based on the weight of the basalt fibre.

In a much preferred embodiment of the fibre cement composition according to the present invention, the basalt fibre comprises
  $SiO_2$ of from about 45 to about 60 weight percent,
  $Al_2O_3$ of from about 12 to about 19 weight percent,
  $Fe_2O_3$ of from about 5 to about 15,
  CaO of from about 6 to about 12 weight percent,
  MgO of from about 3 to about 7 weight percent,
  $TiO_2$ of from about 0.9 to about 2.0 weight percent, and
  $Na_2O$ of from about 0.9 to about 2.0 weight percent, based on the weight of the basalt fibre. It has been found that basalt fibres having this composition confer excellent fire resistance and excellent mechanical properties to the fibre cement products into which they are incorporated.

In a preferred embodiment of the fibre cement composition according to the present invention, the inorganic fibre has a density of about 2.6 to about 2.8 $g/cm^3$, when measured according to ISO137-1975.

In a preferred embodiment of the fibre cement composition according to the present invention, the basalt fibre basalt fibre has a density of about 2.6 to about 2.8 $g/cm^3$, and/or a tensile strength of between 100 and 110 cN/tex, when measured according to DIN ISO EN 10618, and/or has a fibre diameter of from about 8 to about 20 micrometers, preferably of from about 12 to about 16 micrometers, when measured according to ISO137-1975.

In a preferred embodiment of the fibre cement composition according to the present invention, the glass fibre has a density of about 2.6 to about 2.8 g/cm3, and/or has a fibre diameter of from 15 to 25 micrometers when measured according to ISO137-1975.

In a preferred embodiment of the fibre cement composition according to the present invention, the inorganic fibre has a L/D ratio of between 150 to about 1400, more preferably of 150 to about 375.

In a preferred embodiment of the fibre cement composition according to the present invention, the inorganic fibre is a glass fibre, the inorganic fibre has a LID ratio of between 150 to about 600, more preferably of 150 to about 300.

In a preferred embodiment of the fibre cement composition according to the present invention, the inorganic fibre is a basalt fibre, the inorganic fibre has a LID ratio of between 250 to about 1400, more preferably of 250 to about 375.

In a preferred embodiment of the fibre cement composition according to the present invention, the fibre cement composition does not comprise an inorganic fibre that is an asbestos fibre.

In a preferred embodiment the fibre cement composition according to the present invention, the fibre cement composition does not comprise a synthetic polymer fibres such as polyethylene (PE) fibres or polyvinylalcohol (PVA) fibres.

In a preferred embodiment of the fibre cement composition according to the present invention, the fibre cement composition further comprises an intumescent agent, a fire retardant agent, a filler, or a pigment, or combinations thereof.

In a preferred embodiment of the fibre cement composition according to the present invention, the fibre cement composition further comprises aluminium trihydrate (ATH), hydromagnesite, huntite, or combinations thereof.

In a preferred embodiment of the fibre cement composition according to the present invention, the fibre cement composition comprises the hydraulic binder in an amount of 50 to 94 dry weight percent, preferably of 70 to 94 dry weight percent, based in on the total dry weight of the fibre cement composition.

In a preferred embodiment of the fibre cement composition according to the present invention, the fibre cement composition comprises the inorganic fibre in an amount of 2 to 6 dry weight percent, preferably in an amount of 3 to 5 weight percent, based in the total dry weight of the fibre cement composition.

In a preferred embodiment of the fibre cement composition according to the present invention, the fibre cement composition comprises the organic fibre in an amount of 1 to 10 dry weight percent, preferably in an amount of 1 to 5 weight percent, based in the total dry weight of the fibre cement composition.

In a preferred embodiment of the fibre cement composition according to the present invention, the organic fibre may further be treated with a fire-retardant agent. However, it has been found that the excellent mechanical and fireproof properties may be achieved also with organic fibre that is not treated with a fire-retardant agent, such as bleached or unbleached chemical wood pulp. It is understood that when organic fibre that is treated with a fire-retardant agent is used, a lesser amount can be used, when compared to the case where organic fibre that is not treated with a fire-retardant agent is used, such as chemical wood pulp.

In a preferred embodiment of the fibre cement composition according to the present invention, the organic fibre is not treated with a fire-retardant agent.

It is further an object of the present invention to provide a fibre cement product or a building material obtained from the fibre cement composition according to the above, preferably obtained via the Hatschek process. The building material may be, for example a roofing element or a cladding element. Roofing elements may for example be in the form of roof shingles, roof tiles, corrugates roof panels and such. Cladding elements may for example be in the form of cladding tiles, cladding panels, clapboards, corrugated siding panels and such.

It is moreover an object of the present invention to provide a cladding element or roofing element, comprising a sheet of fibre cement product or budding material according to the above, preferably fulfilling the requirements of EN 12467 (cladding), EN 492 and EN494 (roofing).

In a preferred embodiment of the cladding element or roofing element according to the present invention, the roofing or cladding element further comprises a coating applied to at least the exterior side of the roofing or cladding element, preferably in an amount of less than 350 grams per square meter (sqm), preferably between 80 and 200 grams per sqm, based on the total weight of the cladding or roofing element and/or a thickness of about 40 to 80 micrometers.

EXPERIMENTAL DATA

Samples 1 were prepared by combining about 25 kg of Normo 4 cement (93.5 dry weight), 0.72 kg (2.6 dry weight) of cellulose fibre, and 1.039 kg of chopped basalt fibre having a length of 4 mm and a density of about 2.7 (3.9 dry weight) in water to provide a slurry. The slurry introduced into a laboratory sheet former that produced rectangular tiles having a thickness of about 4 mm.

Samples 2 were prepared by combining about 25 kg of Norma 4 cement (93.8 dry weight), 0.72 kg (2.6 dry weight) of cellulose fibre, and 1.039 kg of chopped glass fibre having a length of 6 mm and a density of about 2.5 (3.6 dry weight) in water to provide a slurry. The slurry introduced into a laboratory sheet former that produced rectangular tiles having a thickness of about 4.1 mm.

Reference Samples were prepared by combining about 60 kg of Normo 4 cement (93.76% dry weight), 1.666 kg (2.6% dry weight) of cellulose fibre, and 1.164 kg of PVA fibre having a length of 4 mm (1.82% dry weight), 2.818 kg of PE fibre having a length of 1.2 mm (1.82% dry weight) in water to provide a slurry. The slurry introduced into a laboratory sheet former that produced rectangular tiles having a thickness of about 4.8 mm.

The Samples 1, 2 and Reference compared to each other with respect to their modulus of rupture. Sample 1 exhibited a modulus of rupture of about 22.05, 22.35 and 22.72 MPa after 7, 28, and 56 days, of air drying, respectively. Sample 2 exhibited a modulus of rupture of about 20.5, 21.52 and 22.59 MPa after 7, 21 and 56 days, of air drying, respectively. Sample Reference exhibited a modulus of rupture of about 25.59, 26.26 and 27.17 MPa after 7, 28, and 56 days, of air drying, respectively.

Samples 1 and 2 displayed mechanical properties, e.g. modulus of rupture, similar to that of Sample Reference, which enables the use of such compositions for cladding and/or roofing. All samples fulfilled the requirements of EN 12467 (use as cladding panels), EN 492 and EN494 (use as roofing panels).

The Samples 1, 2 and Reference were compared to each other with respect to their fire resistance according to ISO 1182:2020. Samples 1 and 2 fulfilled the requirements of EN 13501-1 for the class A1 whereas Sample Reference did not. Without wishing to be held to a theory, it is believed that the synthetic polyolefin fibers included in the Reference Sample, upon exposure to a heat source, liquefy and evaporate within the bulk of the sample, to fissure the sample from within before bursting into flame when the sample reaches past the auto-ignition temperature of the polymers.

Furthermore, after heating to 750° C. for 20 min., the reference Sample exhibited a weight loss of about 15.6% whereas Samples 1 and 2 exhibited a weight loss of 8.7% and 9.9%, respectively.

Thus, the fibre cement material incorporating inorganic reinforcing fibres according to the present invention displayed excellent fire resistance without losing mechanical properties that are needed when used as construction material. The fibre cement material incorporating organic reinforcing fibres did not fulfil the fire resistance requirements.

The invention claimed is:

1. A fibre cement composition, comprising:
    at least one hydraulic binder,
    an organic processing aid fibre as the sole organic fibre comprised in the fibre cement composition, and wherein the organic processing aid fibre consists of wood pulp, and
    at least one inorganic fibre, and wherein the inorganic fibre is basalt fibre, or a combination of basalt fibre and glass fibre, the inorganic fibre having an average length of about 2 mm to about 8 mm,
    wherein the fibre cement composition comprises the organic fibre in an amount of more than 2 and up to 10 dry weight percent, based on the total dry weight of the fibre cement composition.

2. The fibre cement composition according to claim 1, wherein the wood pulp is chemical wood pulp, and/or has a fibre length in excess of 2 mm.

3. The fibre cement composition according to claim 1, wherein the inorganic fibre has an L/D ratio of 150 to 1400.

4. The fibre cement composition according to claim 1, wherein the average length of about of the inorganic fibre is about 2 mm to 6 mm and/or the inorganic fibre has a diameter of about 5 to 25 μm.

5. The fibre cement composition according to claim 1, wherein the inorganic fibre is an alkaline-resistant fibre.

6. The fibre cement composition according to claim 1, wherein the inorganic fibre is a basalt fibre comprising:
    $SiO_2$ of from about 45 to about 60 weight percent, or
    $Al_2O_3$ of from about 12 to about 19 weight percent, or
    $Fe_2O_3$ of from about 5 to about 15, or
    CaO of from about 6 to about 12 weight percent, or
    MgO of from about 3 to about 7 weight percent, or
    $TiO_2$ of from about 0.9 to about 2.0 weight percent, or
    $Na_2O$ of from about 0.9 to about 2.0 weight percent, based on the weight of the basalt fibre.

7. The fibre cement composition according to claim 1, wherein the inorganic fibre is a basalt fibre having a density of about 2.6 to about 2.8 g/cm$^3$, and/or a tensile strength of between 100 and 110 cN/tex, when measured according to DIN ISO EN 10618, and/or has a fibre diameter of from 10 to 16 micrometers when measured according to ISO137-1975.

8. The fibre cement composition according to claim 1, wherein the inorganic fibre includes a glass fibre having a density of about 2.6 to about 2.8 g/cm$^3$, and/or has a fibre diameter of from 15 to 25 micrometers when measured according to ISO137-1975.

9. The fibre cement composition according to claim 1, wherein it comprises the hydraulic binder in an amount of 70 to 94 dry weight percent, based on the total dry weight of the fibre cement composition.

10. The fibre cement composition according to claim 1, wherein it comprises the inorganic fibre in an amount of 2 to 6 dry weight percent, of 3 to 5 dry weight percent, based in the total dry weight of the fibre cement composition.

11. A fibre cement product selected from a cladding building material or a roofing element building material comprising the fibre cement composition according to claim 1.

12. The fibre cement product according to claim 11, fulfilling the requirements of EN 12467, EN 492 and/or EN495.

13. The fibre cement product according to claim 12, further comprising a coating applied to at least the exterior side of the cladding or the roofing element, in an amount of less than 1 weight percent, based on the total weight of the cladding or roofing element and/or having a thickness of about 20 to 30 micrometers.

14. The fibre cement composition according to claim 1, wherein the organic processing fibre has a fibre length in excess of 2.5 mm.

* * * * *